Oct. 28, 1969 G. PAPST 3,475,563

CASSETTE TYPE TAPE RECORDER HAVING A HORIZONTAL DISPLACEABLE CASSETTE HOLDING DECK

Filed Oct. 24, 1966 4 Sheets-Sheet 1

Inventor:
Georg Papst

Inventor:
Georg Papst

Oct. 28, 1969 G. PAPST 3,475,563

CASSETTE TYPE TAPE RECORDER HAVING A HORIZONTAL DISPLACEABLE CASSETTE HOLDING DECK

Filed Oct. 24, 1966 4 Sheets-Sheet 3

Inventor:
Georg Papst

Inventor:
Georg Papst

United States Patent Office 3,475,563
Patented Oct. 28, 1969

3,475,563

CASSETTE TYPE TAPE RECORDER HAVING A HORIZONTAL DISPLACEABLE CASSETTE HOLDING DECK

Georg Papst, 1 Karl Maierstrasse, 7742 St. Georgen, Black Forest, Germany

Filed Oct. 24, 1966, Ser. No. 588,820
Claims priority, application Germany, Oct. 25, 1965, P 37,950; July 2, 1966, P 39,857; July 8, 1966, P 27,577, P 39,898; July 27, 1966, P 27,718
Int. Cl. G11b 5/00
U.S. Cl. 179—100.2 15 Claims

ABSTRACT OF THE DISCLOSURE

A tape recorder comprising a displaceable deck for receiving a sound tape cassette with two spools, and two spindles mounted on the deck for carrying the spools. A drive shaft forms part of the tape recorder and is coupled to a selected one of the aforesaid spindles by displacement of the deck.

The invention relates to a tape recorder for sound tapes in cassettes, wherein the inoperative condition and the operative conditions such as recording/playback, fast wind and fast rewind are brought about by actuating means. The present invention more specifically concerns to a novel and improved construction which permits to reduce the manufacturing costs of tape recorders.

It is a further object of the invention to simplify the operation of said tape recorders so as to increase the scope of use of these recorders.

Numerous drive means for tape recorders are already known. More recently, cassettes have been proposed for tape recorders in which the two spools, namely the loaded spool and the take-up spool, are combined in a housing and such housing, together with the tape located therein, is placed on the recorder. The tape is well protected in these cassettes and for this reason recorders with cassettes have very rapidly been generally accepted. However, after inserting the cassette it has hitherto been neecssary to actuate switches by means of which the recorder is brought into the individual operative and inoperative conditions, namely recording, playback, fast wind, fast rewind and stop.

There have already been described cassettes for use in a tape recorder, each cassette having openings in only one side of the housing for introducing the tape scanning elements and the pressure roll and in which the base is provdied with an additional opening for introducing the drive shaft. Behind the tape, a resiliently mounted felt plate is mounted in the central aperture of three apertures.

It is a main object of the invention to provide an arrangement of the type mentioned which is comparatively simple in its structure and reliable, wherein individual operations of the recorder are actuated in co-operation with the cassette in a particularly convenient manner.

According to the invention, in a tape recorder for sound tapes in cassettes in which the inoperative condition and the operative conditions such as recording/playback, fast wind and fast rewind can be switched by actuating means, the cassette is mountable on a deck that carries the capstan and the spindles for the loaded spool and take-up spool and that is displaceable within limits parallel to a face of the recorder, the construction being such that the individual operative conditions can be brought about by displacing the deck with cassette to a selected one of the limits of displacement at which the deck may possibly be locked in position and at which the capstan and one of the spool carriers will be coupled to the drive shaft in accordance with the requirements of the selected operative condition.

In a preferred embodiment of the invention the deck is mounted for movement in a plane that is normal to the drive shaft of the motor so that, when the deck reaches the limit of its movement in a direction towards the drive shaft, an operative friction wheel connection is brought about between the capstan and the drive shaft and the deck is held in this operative position by locking means.

It is further possible and in certain cases even advantageous to have the deck also be displaceable from the inoperative position in both directions transverse to the switching on movement so that, in one of the limiting positions, the drive shaft for one of the spools is coupled through a friction wheel drive to the motor shaft for rapid wind, whereas in the other limiting position the other spool is coupled through a friction wheel drive to the motor shaft for fast rewind.

The hitherto conventional keys or push buttons and their associated locking means can be dispensed with by using the invention.

Other technical features and their special advantages will now be described in conjunction with the accompanying drawings which illustrate several embodiments by way of example and in which integers of an embodiment that correspond to the integers of another embodiment are designated with the same reference numerals. More particularly:

Figure 1:
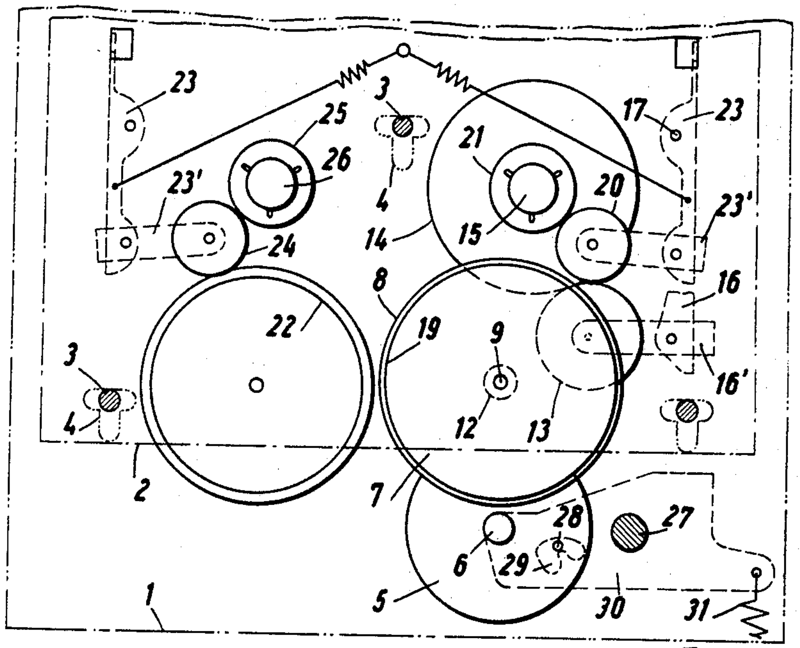
FIG. 1 is a plan of a tape recorder equipped with friction wheel drives and shown in the idling or inoperative condition.
Figure 2:
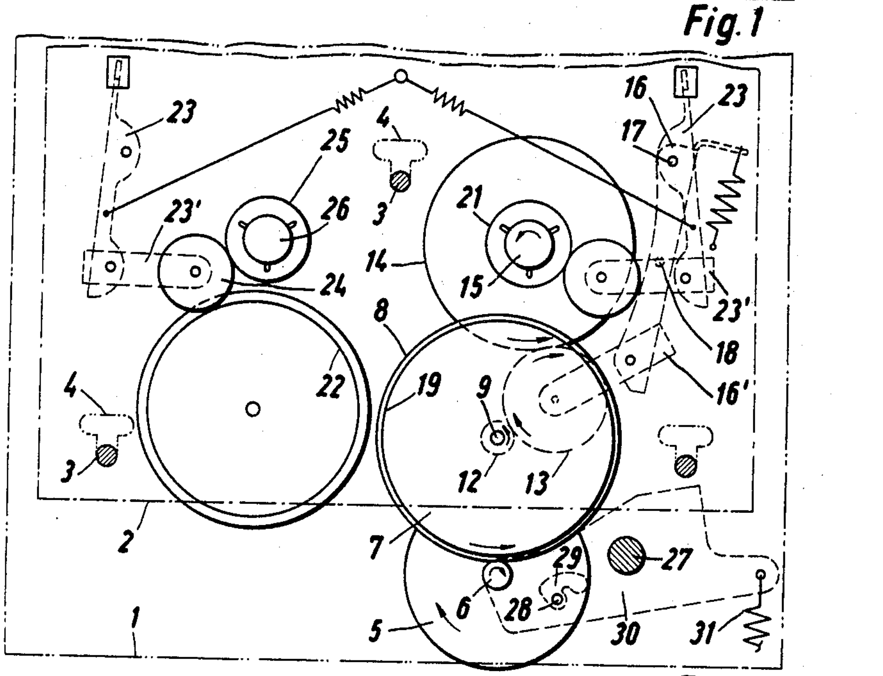
FIG. 2 is a similar view showing the recorder in the condition for recording and playback.
Figure 3:
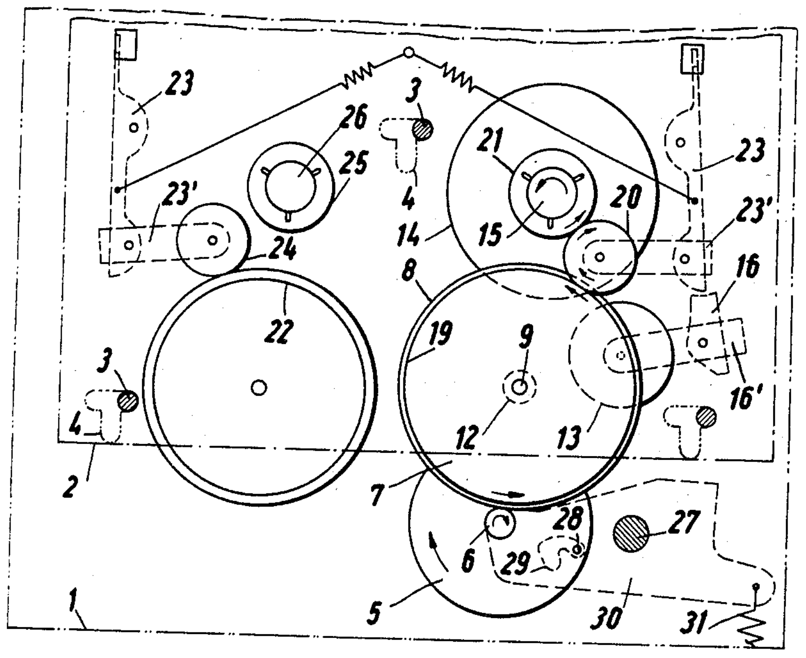
FIG. 3 is a similar view showing the recorder in the condition for fast wind.
Figures 4, 5:
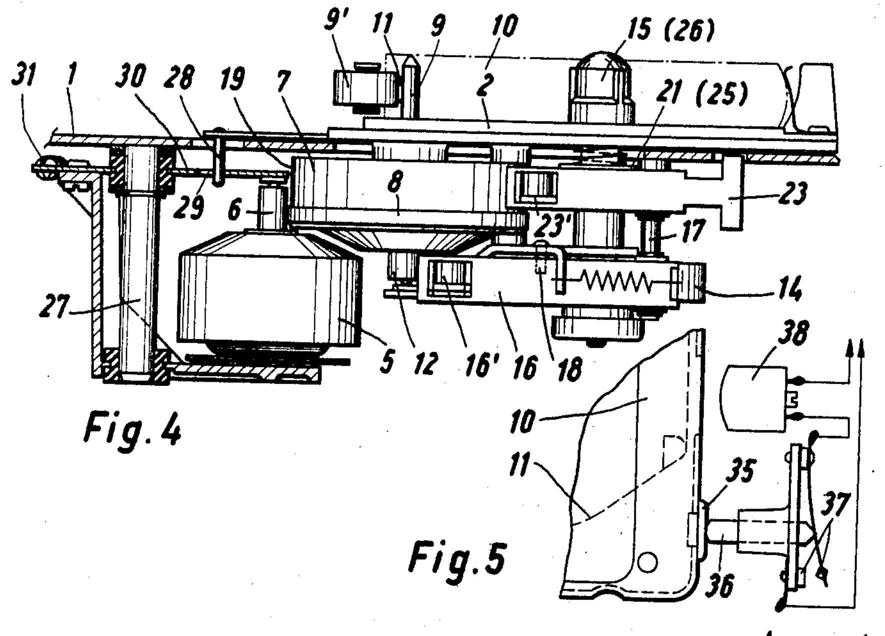
FIG. 4 is a sectional side elevation of the drive mechanism of the recorder, the mounting pin for the motor being illustrated as turned through 90 degrees for the purpose of clarity.
FIG. 5 is a detail showing the switching off mechanism for the erasing head.

FIGS. 1 to 4 illustrate the portion of a tape recorder 1 that carries the drive mechanism. The top of the recorder carries a displaceably mounted deck 2 which has three guide slots 3 for engaging guide pins 4. As best seen in FIG. 4, the drive motor 5 with drive shaft 6 is located beneath the deck. For the purpose of recording or playback, rapid wind and rapid rewind, the drive shaft 6 is in direct engagement with the fly wheel 7 by means of an elastic friction covering 8 around the periphery of the fly wheel. The capstan 9 is located centrally in the fly wheel. As shown in FIG. 4, it projects into the cassette 10 which is shown in chain-dotted lines.

The sound tape 11 is transported at a predetermined speed by means of a resiliently pivotable pressure roll 9'. Winding during recording or playback is effected by the friction roll 12 driven at the underside of the fly wheel 7 and acting through the doubly pivotally mounted friction wheel 13 acting on the large friction disc 14. This friction disc is connected to the winding mandrel 15 by means of a friction coupling which is not illustrated. The linkage 16 and 16' of the friction wheel 13 is fixed to the frame 1 of the recorder by the pin 17 and is controlled by the movable deck 2 by means of a guide pin 18 so that the friction wheel 13 is uncoupled during fast wind and fast rewind but is operatively coupled to the friction roll 12 and to the friction disc 14 during recording and playback. For fast winding as illustrated in FIG. 3, the operative connection from the motor shaft 6 takes place through the elastic friction covering 8 and the fly wheel 7 and further from the cylindrical peripheral surface 19 of the fly wheel 7 via the friction wheel 20 onto the friction disc 21 which is rigidly connected to the winding mandrel 15. The friction wheel is seated on the linkage 23 and 23'.

For rapid rewinding, which condition is not illustrated, the fly wheel 7 mounted in the movable deck 2 is brought into contact with an intermediate wheel 22 which is fixed to the frame 1 of the recorder and which serves to reverse the direction of rotation.

The friction wheel 24 which is likewise attached to a doubly pivotally mounted linkage 23 and 23' is spring influenced into operative contact between the friction disc 25 and the intermediate wheel 22. The friction disc 25 is rigidly connected to the winding mandrel 26.

The drive motor 5 is rotatably suspended on the mounting pin 27 at right angles to the face of the frame 1 and in a manner so as not to transmit vibrations. The individual switching functions are carried out by means of the guide pin 28 which is fixed to the movable deck 2 and engages in a cam slot 29 of the motor yoke 30. The tension spring 31 ensures for the necessary pressure of the motor shaft 6 on the friction covering 8 of the fly wheel 7. As evident from the individual operative positions, the guide pin 28 lies against the wall of the cam slot 29 of the yoke 30 only in the inoperative position of FIG. 1 so that the drive shaft 6 and fly wheel 7 are out of engagement in order to avoid any influences that might be detrimental to synchronism.

The above described drive unit is a friction wheel drive and thus has the advantage that only the friction wheels required for the individual operative conditions are operatively intercoupled.

In order to avoid accidental erasing of a recorded tape in the cassette, a plug 35 may be inserted in a recess of the cassette 10 as shown in FIG. 5. When the cassette is displaced, the plug actuates a sensing pin 36 and opens the switch 37 so as to de-energise the erasing head 38. Similarly, the recording head is de-energised simultaneously.

The recorder as described has the particular advantage of permitting the important operations to be switched by displacing the cassette together with the deck. The cassette itself constitutes the operating handle. In some cases it may be desirable to provide a separate handle by means of which the mounted cassette and the deck are displaced into the appropriate operative position.

Figure 6:
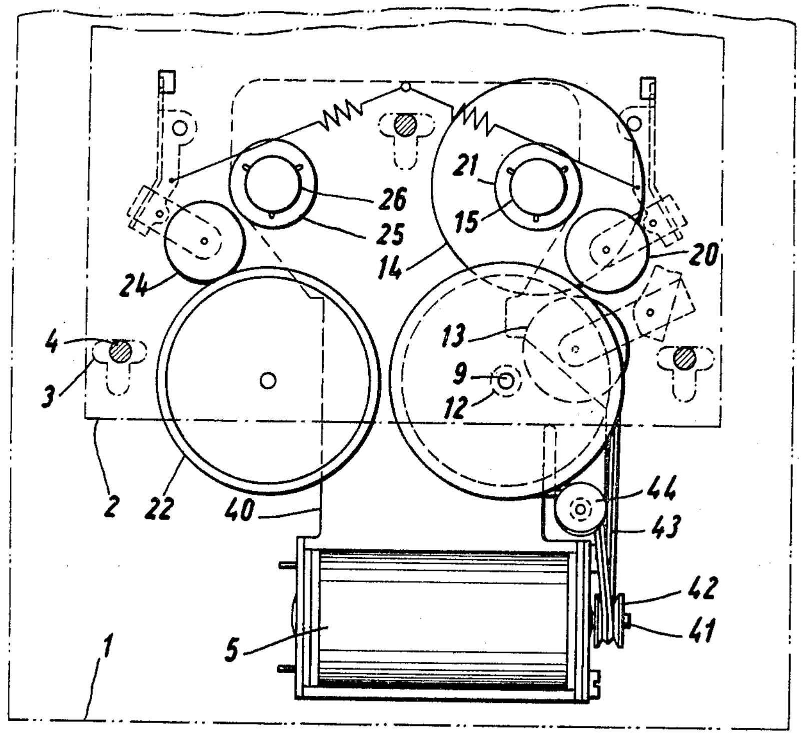
FIG. 6 is a view similar to FIG. 1 but of a second embodiment in which the motor is mounted horizontally and the recorder is in the inoperative position.
Figure 7:
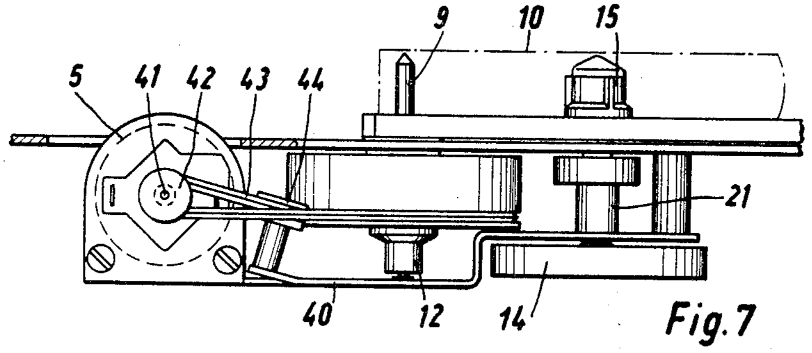
FIG. 7 is a sectional side elevation of the drive mechanism for the FIG. 6 recorder, the two friction wheels and their linkages having been omitted for clarity.

In the embodiment of FIGS. 6 and 7, the drive motor 5 is mounted on an intermediate plate 40 which is fixed to the deck 2. The motor is insulated from vibrations. The flywheel 7 contains a V-groove and is driven by the motor shaft 41 acting through a pulley 42 thereon and a belt 43. The belt 43 is brought into a predetermined path by means of a direction changing roll 44. The capstan 9 arranged centrally in the flywheel 7 has a bearing in the deck 2 and extends into the cassette 10 that is shown in chain-dotted lines.

Slow recording or playback is effected by the friction roll 12 driven by the flywheel 7, through the friction wheel 13 onto the friction disc 14 which is equipped with a friction clutch that connects it to the winding mandrel 15.

For fast winding the flywheel 7 that is constantly coupled to the drive motor 5 by the belt 43 is brought into operative engagement through the friction wheel 20 with the friction roll 21 that is rigidly connected to the winding mandrel 15.

For rapid rewinding, the flywheel 7 is connected to the intermediate wheel 22 that serves to reverse the direction of rotation and the friction wheel 24 is connected to the friction wheel 25 which is rigidly connected to the winding mandrel 26.

It may be mentioned that the drive motor 5 rotates in the same sense in all switched positions.

Figure 8:
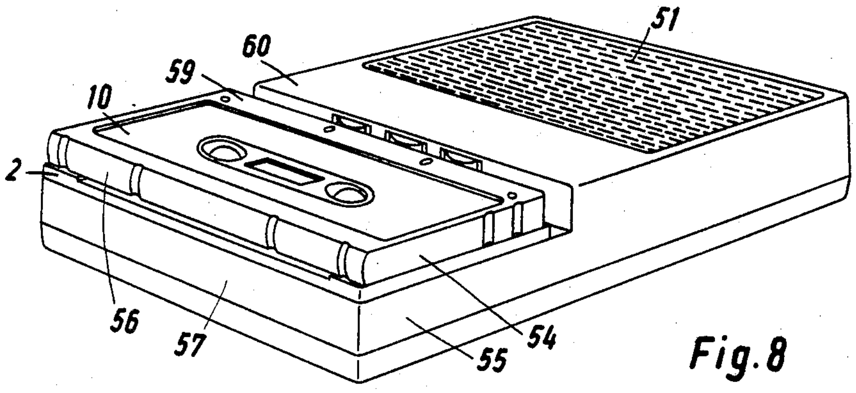
FIG. 8 is a perspective view of a recorder.

In the embodiment according to FIG. 8, the cassette 10 (34) is substantially in the shape of a flat parallelepiped. It is located in an appropriate recess of the recorder 51, being placed on or plugged to the deck 2 disposed in the recess. In the illustrated operative position of the recorder, three sides of the cassette are flush with the associated vertical sides of the recorder. It will be seen that the side 54 of the cassette is flush with the vertical side 55 of the recorder and the side 56 of the cassette is flush with the vertical side 57 of the recorder. The flat top face 59 of the cassette and the upper face 60 of the adjoining surface of the recorder lie in the same plane.

This particular equipment has the following advantages:

(1) The cassette is complementary to the recess in the recorder and therefore results in an aesthetically attractive appearance.

(2) Upon lateral displacement of the cassette for the purpose of winding or rewinding, a vertical side of the cassette is pushed beyond the side of the recorder with which it was flush in the inoperative condition. In this way the outlines of the recorder are considerably changed. The switched operative condition can therefore be readily distinguished visually as well as by touch. Operation of the recorder can therefore be carried out in the dark or by a blind person.

(3) The condition for rapid winding or rewinding differs from the inoperative condition and from the normal recording and playback condition and can be distinguished by the resulting difference in outline.

Return from rapid winding or rewinding to the inoperative position is facilitated in that the superjacent sides of the recorder and cassette need merely be brought into a position where they are flush with one another.

Figure 9:
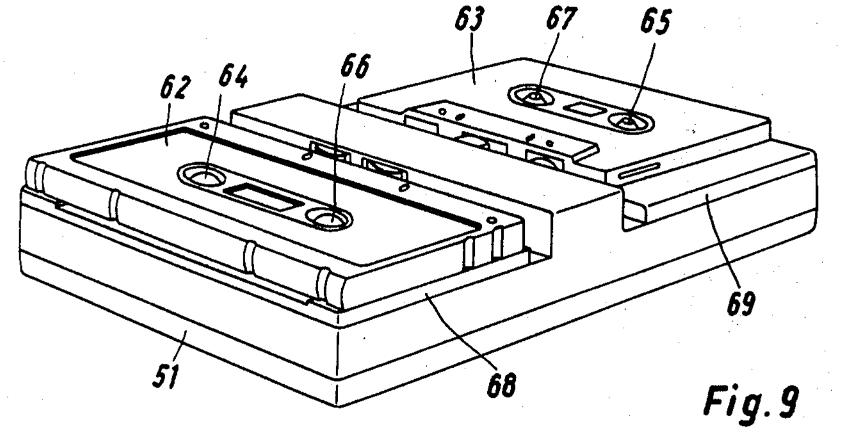
FIG. 9 is a similar perspective view of a recorder suitable for applying to cassettes.

The embodiment of FIG. 9 is based on the consideration that, for general application, it would be very useful to have a tape recorder which is suitable for both of the two most important cassettes that are presently being marketed. In Germany there are two different systems of tape cassettes which are not only different in dimensions but the tapes of which also have to be played at different speeds.

The tape recorder 51 of FIG. 9 has a large cassette 62 and a smaller cassette 63. Each of these is located in a corresponding recess in the top of the recorder. Each cassette has a winding mandrel 64 or 65 for recording or playback and a winding mandrel 66 or 67 for rewind. These mandrels 64, 65, 66, 67 are coupled with the associated drive shafts when the cassettes are placed on the deck 68 or 69 respectively.

This recorder has the advantage that the user can play both types of cassettes and need not always predetermine whether a particular cassette is suitable for his equipment or rather he does not have to rewind the tape onto a cassette which is suitable for his recorder.

The drive motor for playing one of the tapes is also suitable for the other tape. The electronic equipment, i.e. especially the playback head, amplifier and built-in loudspeaker, can be selectively used for playing either type of cassette. There is therefore no additional cost in electronic equipment.

The aesthetic appearance of the recorder is particularly attractive if the top faces of both cassettes lie in the same plane.

Figure 10:
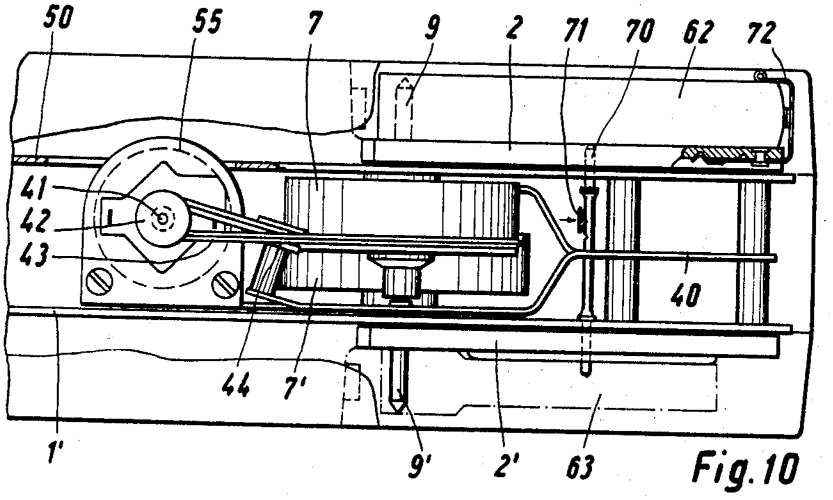
FIG. 10 shows a further embodiment of a recorder for two cassettes.

FIG 10 illustrates an embodiment in which the two cassettes are engaged with opposite faces of the recorder.

The two different sizes of cassettes 62 and 63 are each placed on a deck 2 or 2' which is displaceable relatively to the frame 1 or 1' respectively. The capstan 9 projects into the cassette 62 whilst the capstan 99 projects into the cassette 63. Fly wheels 7, 7' are connected to the capstans 9, 9' respectively. The drive motor is mounted on the intermediate plate 40 and the motor shaft 41 carries the pulley 42. This pulley drives the belt 43 which, in turn, drives the fly wheels via a direction changing roll 44. A switching pin 70 is provided and this is displaceable parallel to the capstans 9, 9'. Upon mounting a cassette, the pin is axially displaced and prevents mounting of a cassette on the opposite side of the recorder. The drawing illustrates how a mounted cassette 62 has displaced the pin to project beyond the deck 2' on the underside of the recorder and thereby prevent mounting of the cassette 63. A spring 71 engages in corresponding recesses in the switching pin 70 so that the latter is latched in the two operative positions. A retaining spring 72 ensures that the mounted cassette is securely held to the deck.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed and desired to be secured by Letters Patent is:

1. A tape recorder comprising a drive shaft, a deck for receiving a sound tape cassette which embodies a loaded spool and a pick-up spool, a capstan on said deck for transporting said tape, means for rotating said capstan from said drive shaft, spindles on said deck for said loaded spool and said take-up spool, means mounting said deck for displacement within limits, and means effective operatively to couple said drive shaft to a selected one of said loaded and take-up spools in response to displacement of said deck to a selected one of said limits.

2. A recorder according to claim 1, including means for releasably locking the deck in the selected limit of displacement.

3. A recorder according to claim 1 wherein the cassette is movable parallel to the upper face of the recorder and mounted for pivotal movement about an axis that is normal to said upper face.

4. A recorder according to claim 1 wherein the deck is displaceable from the inoperative position to an on position and is also displaceable in both directions perpendicular to said movement to the on position so that, in one limiting position the drive shaft of one of the spools is coupled to the motor shaft via a friction wheel drive for the purpose of rapid winding whereas in the other limiting position the other spool is coupled to the motor shaft through a friction wheel drive for the purpose of rapid rewind.

5. A recorder according to claim 1 wherein a member projecting beyond the upper surface of the deck is movably mounted and cooperates with a switch such that, when the cassette is applied to the deck, said member is displaced to switch on the drive motor.

6. A recorder according to claim 1 including a projecting sensing element which is movable in a direction parallel to the deck movement from the inoperative to the recording or playback position, wherein said sensing element is forcibly displaced during movement of the deck from the inoperative to the recording or playback position and is connected to a switch so that, upon such forcible displacement, the erasing head and the recording head are de-energised.

7. A recorder according to claim 1 comprising a flywheel and winding mandrel, two friction wheel drives between the flywheel and winding mandrel, namely a drive for slow transport of the tape and a drive for rapid wind, a further friction wheel drive between the flywheel and the winding mandrel that effects rapid rewind of the tape, and means which ensure that in the inoperative position of the recorder none of these four friction wheel drives is operatively connected whilst at any of the operative conditions of the recorder only the appropriate friction wheel drive is operative whilst the other friction wheel drives are inoperative, and wherein the displaceable deck carries an extension which projects inside the recorder and engages in a recess of a pivotal arm carrying the motor, and wherein said recess is so shaped that, in the inoperative position of the deck, the motor is not operatively connected to the flywheel but in each operative position the motor shaft is resiliently pressed directly against the flywheel.

8. A recorder according to claim 1 including a flywheel and a winding mandrel and wherein the drive motor is fixed horizontally to the deck and is in constant engagement with said flywheel through a belt drive whilst two friction wheel drives are provided between said flywheel and said winding mandrel, namely a friction wheel drive for slow transport of the tape and a friction wheel drive for rapid wind, and wherein a further friction wheel drive is provided between said flywheel and said winding mandrel effecting rapid rewind of the tape, means being provided which ensure that, in the inoperative condition of the recorder, none of these four friction wheel drives is operatively connected whereas in each of the operative conditions of the recorder only the appropriate friction wheel drive is operative whereas the other friction wheel drives are inoperative.

9. A recorder according to claim 1 in which the cassette is flat and mountable on the upper face of the recorder, the length of the cassette being equal to a horizontal recess in the recorder, and wherein in one operative condition of the recorder at least two and preferably three sides of the cassette are flush with the associated vertical sides of the recorder.

10. A recorder according to claim 1 including means on the upper surface of the recorder for receiving two cassettes, and winding mandrels for wind and rewind of both cassettes being mounted at the top with their axes parallel and being selectively driven by one and the same motor which also serves to drive the capstan.

11. A recorder according to claim 10 wherein the playback head has two operative positions and is pivotally mounted so that in each operative position it touches the tape of one of the cassettes.

12. A recorder according to claim 10 wherein the sound heads associated with the two cassettes are structurally combined to form a double head which is effective on both sides and which is constructed so that it is effective to both sides of the cassette so that the tape in contact with the head will be played.

13. A recorder according to claim 1 including means on each of two opposed faces of the recorder each for receiving one cassette, the capstans for driving the tapes being parallel to one another and projecting from opposite sides of the housing, and wherein each capstan is coupled to a flywheel and the two flywheels rotate in opposite directions and are inter-coupled.

14. A recorder according to claim 13 including blocking means which, upon mounting a cassette on one side of the recorder, prevent mounting of a cassette on the other side of the recorder.

15. A recorder according to claim 1 including a switch coupled to the blocking means, which switch ensures that only the sound heads on the top of the recorder are electrically connected to the recording or playback amplifier.

References Cited

UNITED STATES PATENTS

| | | | |
|---|---|---|---|
| 3,146,316 | 8/1964 | Knoth | 179—100.2 |
| 3,394,899 | 7/1968 | Schoenmakers | 242—55.13 |

(Other references on following page)